United States Patent [19]

Swiers et al.

[11] 4,408,745
[45] Oct. 11, 1983

[54] SWIVEL VALVE

[75] Inventors: Richard H. Swiers; Richard G. Parkison, both of Louisville, Ky.

[73] Assignee: American Standard, Inc., New York, N.Y.

[21] Appl. No.: 215,515

[22] Filed: Dec. 11, 1980

[51] Int. Cl.³ .............................................. F16K 1/34
[52] U.S. Cl. ..................... 251/357; 251/86; 251/215; 137/315
[58] Field of Search ................... 251/85, 86, 357, 215; 137/454.5, 315

[56] References Cited

U.S. PATENT DOCUMENTS

| 1,250,433 | 12/1925 | Cummings | 251/88 |
| 2,311,506 | 2/1943 | Arey | 251/85 |
| 2,563,992 | 8/1951 | deGrave | 251/88 |
| 2,568,615 | 9/1951 | Fischer et al. | 251/86 |
| 2,613,907 | 10/1952 | Stillwagon, Jr. | 251/85 |
| 3,552,714 | 1/1971 | Manville | 251/88 |
| 3,558,098 | 1/1971 | Puster | 251/88 |
| 3,565,467 | 2/1971 | Haldopolous et al. | 285/161 |
| 3,700,206 | 10/1972 | Jones | 251/84 |
| 3,904,169 | 9/1975 | Cohn et al. | 251/86 |
| 4,134,420 | 1/1979 | Okonowitz | 137/315 |
| 4,183,501 | 1/1980 | Flynn | 251/357 |

OTHER PUBLICATIONS

American Radiator and Standard Sanitary Corporation Drawing L-5393-A (3-6-59).
American–Standard Development and Engineering Drawing No. 621521-112-500 (dated 1/15/65).

Primary Examiner—A. Michael Chambers
Attorney, Agent, or Firm—Robert C. Crooks; Daniel J. Reardon

[57] ABSTRACT

This invention relates to a faucet valve for controlling the rate of flow of fluid from a first conduit usually to a second conduit in which there is provided a valve stem adapted by means of an externally threaded collar to be mounted and retained in a faucet housing and a swivel valve attached to one end of the foregoing valve stem by engaging or gripping means including a plurality of spaced resilient elongate arms disposed circumferentially about the body of said valve and terminating in a series of fingers or detents retained in, but detachable from, an annular groove formed in the valve stem, and contiguous with the button or flattened knob or foot forming the adjacent end of the valve stem. The valve body is modified on one surface to provide a resilient snap-on engagement of the foregoing arms and fingers with the valve stem.

22 Claims, 5 Drawing Figures

SWIVEL VALVE

TECHNICAL FIELD

This invention pertains to a valve assembly for faucets.

BACKGROUND OF THE ART

It has been known in controlling fluid flow through a faucet heretofore to provide a valve cooperating with a stationary valve seat wherein the valve is adapted to abut the rim of the valve seat in the closed position and to be removed therefrom in the open position so that fluid is permitted free egress from an inlet pipe through the valve chamber containing the valve and valve seat and thence through the outlet pipe into a sink or other fixture.

In returning the valve to the closed position it has proven necessary, in order to assure a positive and continuous seal between the valve and valve seat, obviating leakage through the outlet pipe or conduit, to provide for and overcome misalignment resulting from variations in temperature, mechanical factors and the like that often occur, at least over a period of time, between the valve and valve seat as well as irregularities in the rim of the valve seat itself. This has been accomplished heretofore with varying degrees of success by a multiplicity of different means known generically as swivel valves.

In order to avoid or limit substantially the erosion of the valve surface and the valve seat in the abutting closed position it has proven efficacious to provide that the valve be attached to the valve stem in such a manner that when the valve stem is rotated to close the valve, the valve may upon reaching an effective sealing position in the valve seat, assume a stationary posture, although, as frequently occurs, the valve stem is further rotated to increase the pressure on the valve and the abutment between valve and valve seat.

A variety of swivel valves have also been proposed to effect this purpose. Generally they have resulted in a multiplicity of component parts requiring a carefully balanced and calibrated relationship, awkwardness and significant cost in manufacture and assembly; the use of resilient materials susceptible to fatigue or deterioration over limited periods of time; the substitution of substantial erosion at the point of engagement of the valve with the valve stem for that occurring otherwise at the abutting surfaces of the valve and valve seat; and indeed, in some instances, a reduction in the effectiveness of the fluid seal to decrease erosion by use of less effective sealing materials which have better wearing properties.

In the event, therefore, that a swivel valve could be devised that would permit ready and economic manufacture and assembly, a simple valve construction incorporating a limited number of parts or an integral element capable of accommodating readily for misalignment in relation to a stationary valve seat and independent rotation of the valve stem when the valve is in an abutting position with the valve seat, and that would, at the same time, be composed of a long wearing material or materials that would assure an effective fluid seal and eliminate erosion substantially between valve and valve seat and minimal friction between valve stem and valve, a significant advance in the state of the art would be attained.

DISCLOSURE OF INVENTION

This invention provides, accordingly, a faucet valve for controlling the rate of flow of fluid from a first conduit usually to a second conduit in which there is provided a valve stem adapted by means of an externally threaded collar to be mounted and retained in a faucet housing and a swivel valve attached to one end of the foregoing valve stem by engaging or gripping means composed of a plurality of spaced resilient elongate arms disposed circumferentially about the body of said valve and terminating in a series of fingers or detents retained in, but detachable from, an annular groove formed in the valve stem, and contiguous with the button or flattened knob or foot forming the adjacent end of the valve stem. The valve body is modified on one surface to provide a resilient snap-on engagement of the foregoing arms and fingers with the valve stem.

The foregoing arms abut the annular side walls of the valve stem button or foot and in one embodiment the flattened under and outer surface of the button is in abutting relation with the flattened upper or bearing surface of the valve body about the periphery of which are arrayed the foregoing arms, thus effectively distributing the stress on the resilient valve arms when the valve body is compressed in a closed position.

In a preferred embodiment, a portion of said upper bearing surface disposed about the stem axis may form a recess, thus reducing the bearing surface between the valve body and valve stem and concomitantly the coefficient of friction between the valve and valve stem by providing a reservoir or well filled with entrapped fluid, such as water (or any other liquid being conveyed or regulated by the valve) which acts as a low-friction, liquid bearing between the two components. The upper rim of the stem groove engaging the foregoing fingers or detents is, in accordance with the invention, spaced from the bearing surface, whether the recess is present therein or not, a distance greater than the length of the arms to which the fingers are attached, thus precluding an increased frictional load between the fingers and the upper outwardly extending limit of the annular groove. The valve body is modified on its opposite surface to form a circumferential recess, in which is disposed a compressible washer which is secured in place by ultrasonically upsetting the central projection and thus forming the inverted dome.

The unique construction of the valve and its engagement with the valve stem, provides a valve assembly of simple and effective structure capable of adapting to misalignment of the valve with the valve seat while permitting independent movement of the valve stem with respect to the valve when the latter is in abutment with the valve seat and in a stationary position and accomplishing an effective seal in this position with substantial elimination of friction between the valve and valve stem.

These and other advantages will be evident from the description appearing hereinafter in context with the appended drawings.

BEST MODE OF CARRYING OUT THE INVENTION

Figure 1:
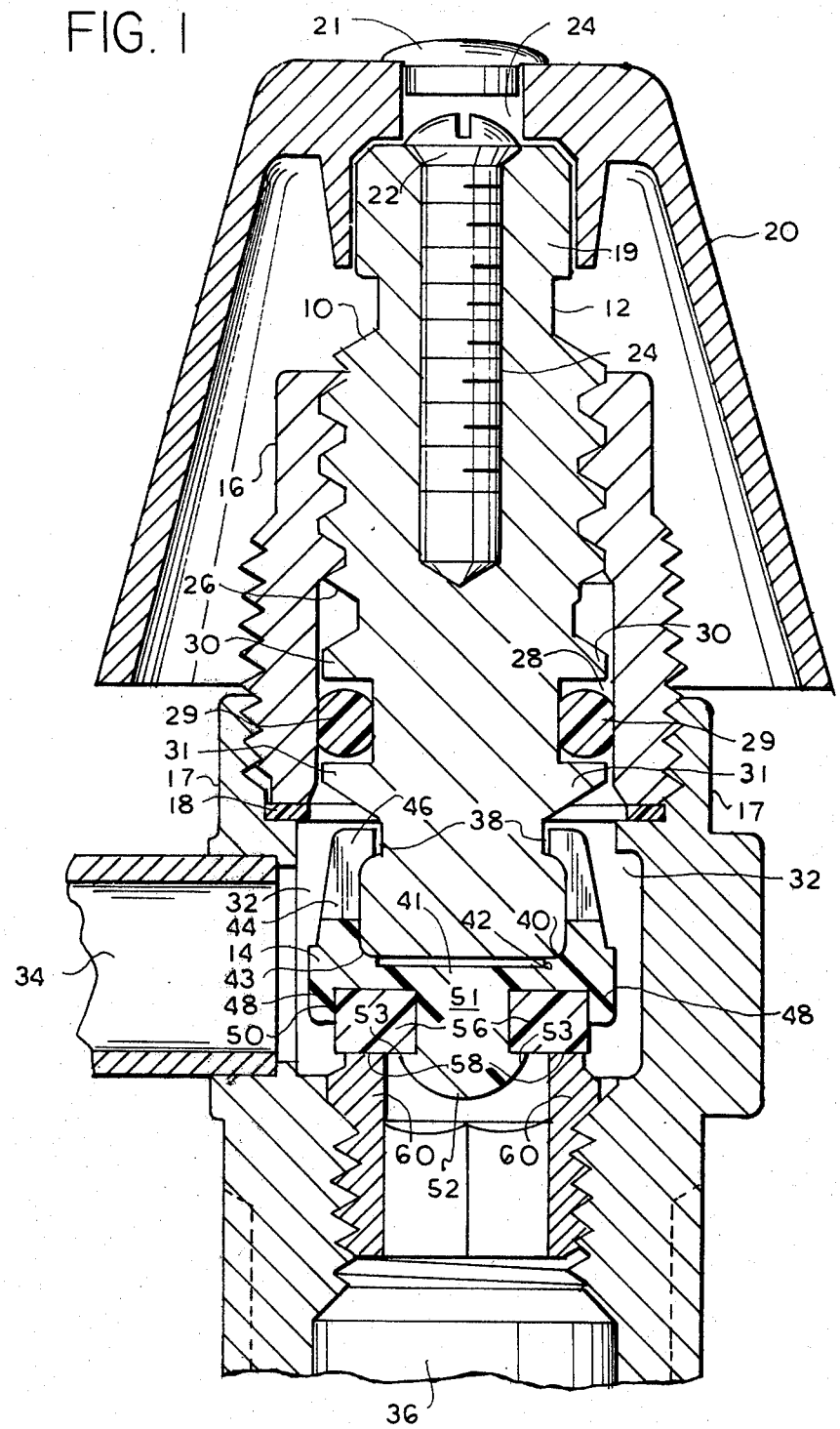
FIG. 1 is a longitudinal sectional view of the valve stem and valve of the invention mounted in a faucet within a valve chamber with fluid inlet and outlet conduits.
Figure 2:
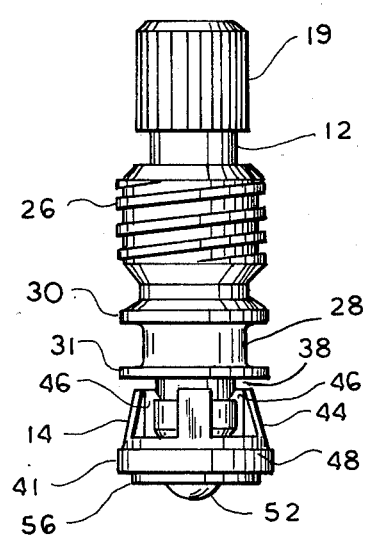
FIG. 2 is an elevational view of the swivel valve and valve stem assembly of the present invention shown in FIG. 1.
Figure 3:
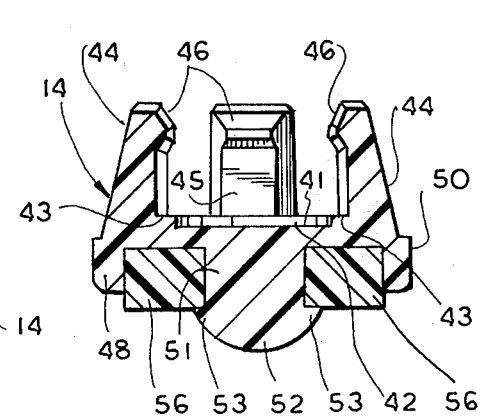
FIG. 3 is an isolated sectional view of the swivel valve of FIGS. 1 and 2.

Referring to the drawings, and with reference particularly to FIGS. 1, 2 and 3 thereof, the valve assembly 10 of the invention comprises a valve stem 12 and a swivel valve 14.

The stem 12 formed normally of brass, or usually less desirably, stainless steel or plastic is threadedly mounted on the internally threaded upper portion of the stem nut or sleeve 16 as shown in FIG. 1 which is, in turn, about its outer lower portion, threadably engaged with the valve housing 17 and seat upon the interposed sealing ring 18. Upon the splined expanded stem head 19 of the stem 12 is mounted the faucet handle 20 to provide for rotation and axial or rectilinear movement of the stem valve 12 and axial movement of the valve 14 attached thereto in the manner and to the extent described elsewhere herein. The faucet handle 20 is otherwise secured to the stem head 19 by a screw 22 received in the threaded interior of the recess 24 axially disposed in the stem head 19 under the faucet index cap 21 and continuing into the body of the stem 12.

Below the threaded exterior 26 of the valve stem 12 there is provided an upper or first circumferential groove 28 in which is disposed an O-ring 29 (as shown in FIG. 1). This first groove 28 is bounded and defined on its upper side by the first annular flange 30 on its lower side by a similar second annular flange 31. The flange 30 is adapted to engage the lower margin of the internally disposed threads of the sleeve 16 when the valve stem 12 and valve are moved outwardly of the valve chamber 32, in which they are mounted, and away from the valve seat 60, defining the maximum valve open position attainable by the valve assembly 10. The second lower flange 31 is interposed between the foregoing upper groove 28 and forms the upper margin or rim of a second annular groove 38 below and parallel to the upper groove 28. The O-ring is employed to preclude leakage about the valve stem 12 from the valve chamber 32 positioned between the ends of the inlet conduit 36 and outlet conduit 34. The O-ring 29 also performs an auxiliary role in providing a minimal but desirable resistance to rotation of the stem valve, tending, as a result, to inhibit abrupt rotation of the handle 20 and the valve assembly 10.

The second, lower, parallel groove 38 is defined, as indicated, in the valve stem 12 by the annular flange or rim 31 and the upper border of the expanded radially flattened stem button or foot 40 of the unitary valve stem 12.

As shown in FIG. 1, that portion of the valve stem 12 commencing with the annular groove 38 and extending to the foot 40 are disposed below the level of the stem nut 16 when the valve stem 12 and valve 14 are in the closed position.

The swivel valve 14 is an integral plastic structure composed preferably of a polyacetal or polyamide (nylon) resin composition and comprises a body portion 41, the outer overlapping periphery of which is modified to provide a plurality of upwardly projecting evenly spaced arms 44 terminating in a like number of inwardly directed fingers or detents 46 adapted for snap-on engagement in the foregoing lower annular valve stem groove 38. The arms 44, for stability and resistance to fracture, also abut the sides of the button or foot 40, but the fingers and arms are so constructed in a significantly preferred embodiment as to embrace respectively no more than one-third of the groove 38 and lateral surface of the stem foot 40.

The valve 14 is, in one embodiment of the invention, also adapted on its upper surface to conform to, abut and overlap the cooperating flattened surface of the stem button or foot 40, thus distributing the stress to which the arms 44 would otherwise be vulnerable. The valve body 41 is, therefore, flat across its upper surface to accommodate to the flat outer surface of the stem button or knob 40. It will be obvious that these abutting surfaces can be modified to present a variety of complementary configurations within the confines of the present invention. In a preferred embodiment, where present as an abutting or bearing surface, a flattened cooperating plane is preferred in that, while the contact of the stem surface with the valve body is complete, it is minimal as contrasted with that which modified contours would provide.

In a particularly preferred embodiment, however, the surface disposed coaxially and concentrically within the periphery of said arms 44 is modified to form a recess 42 which limits the bearing surface contact with the stem foot or knob 40 to the shoulders 43 defining the recess borders and the full extent of the bearing surface in contact with the stem foot 40. The recess 42 provides a well or reservoir for the fluid, that is, the liquid such as water, which is being transmitted through the valve which acts as a low-friction, liquid bearing when entrapped between the surfaces of the two parts.

It is believed, without however, intended to be limited by any particular theory of operation, that the liquid entrapped in the recess 42 carries a substantial portion of the downward force that is imparted by the valve stem 12 to the swivel valve 14. It is believed that this liquid is placed under pressure immediately outboard of the recess entrapping the water therebetween and providing the significant advantage of a liquid thrust bearing with very low friction.

The area of abutment of arms and fingers with the groove 38 and lateral button surfaces will, of course, vary with the composition forming the body of the valve body 41. It has been found particularly functional, as well, to provide four such arms 44 and terminal fingers 46 although as few as three and as many as five, or indeed, six much arms 44 and fingers 46 may be utilized effectively.

Figure 4:
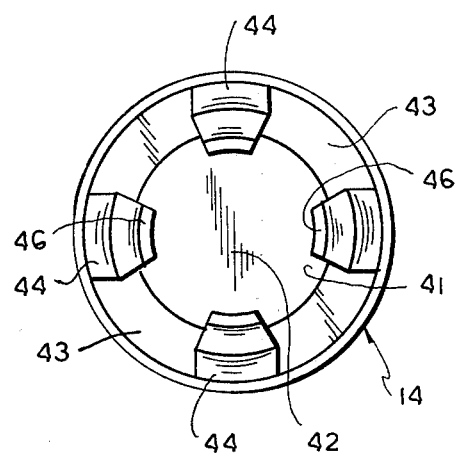
FIG. 4 is a plan view of the upper side of the swivel valve of this invention shown in FIG. 3.

The arms 44 and fingers 46 occur in a preferably, evenly distributed and spaced relation about the periphery of the top side of the valve body 41 as illustrated particularly in FIG. 4.

It is essential, in any event, that the valve 14, including the arms 44 and fingers 46, be formed of a water-insoluble, hard, self supporting, non-corrosive, non-compressible, non-absorptive, chemically resistant synthetic polymeric composition, and most desirably a thermoplastic polyacetal resin, in which the arms and fingers are, in the dimensions employed in the practice of the invention, resilient, whereas the remainder of said valve formed of the same material (exclusive of the washer described hereinafter) is rigid. Significantly preferred is a polyacetal resin and indeed a polyacetal copolymer having a dynamic coefficient of friction in contact with steel or brass or plastic (normally an engineering plastic, such as a polyacetal) of about 0.10 to about 0.35, and preferably about 0.15, as measured by ASTM Test Method D-1894; a Rockwell hardness M-scale of about 30 to about 85 as measured by ASTM procedure D 785; a flexural strength at 5 percent deformation using ASTM D-790 of from 10,000 psi to 15,000 psi and preferably about 13,000 psi; and an elongation of 40° F. of 15 percent to 30 percent, and preferably about 45 percent to 75 percent, and most desirably about 20 percent, and at an ambient temperature of 73° F. of 60 percent, employing ASTM D-638 Speed B. The preferred polyacetal resins for use herein are those resins having a melt index of from 7 to about 27. Polyacetal resins for use herein are sold under the trade designation CELCON by Celanese Corporation and most desirably that designated Celcon M 90-04 and those marketed under the trademark DELRIN by the DuPont Corporation, Wilmington, Del. The coefficient of friction of a polyacetal resin for use in forming the swivel valve of the present invention may be further reduced where desired by use of a polymeric compound or composition such as poly(tetrafluoroethylene) marketed by the DuPont Corporation under the trademark TEFLON, alloyed or admixed with the base resin, such as the foregoing polyacetals.

Another resin useful in forming the valve of the invention (exclusive of the compression washer) is nylon having properties equivalent to those recited for the polyacetal resins characterized hereinabove.

The under or lower surface of the valve body 41 is modified about its outer periphery to form a cylindrical, vertically and downwardly disposed flange or skirt 48, a concentrically arranged annular recess 50 and a centrally positioned neck 51, the end of which is ultrasonically upset to form the retaining head or dome 52 which confines and secures the compression washer 56 into recess 50 by means of the annular shoulder 53 in such a manner as to form an integral unit with the remainder of the valve. In a particularly preferred embodiment, the flange 48 does not embrace the entire side wall of the compression washer 56 nor does the flange 48 descend to a level corresponding to that of the shoulder 53 at the base of the dome 52. This is so in order that the hard or rigid polymeric composition of the valve 14 does not descend to a level where it will affect the mating of the washer with the rim 58 of a cooperating valve seat 60 that extends into the valve chamber 32 and is threadably mounted in the housing 17. In this way, the washer 56, formed of an elastomeric compressible composition such as natural or synthetic rubber, will be permitted a lateral expansion when compressed against the valve seat 60 to better assure an effective fluid seal.

While the swivel valve is formed from a limited group of thermoplastic resins, and as indicated, most desirably a polyacetal copolymer (including terpolymers) of inherent lubricity having a coefficient of dynamic friction within the range of 0.10 to 0.35 and other physical properties such as described hereinabove, the valve washer is formed of an elastomeric polymer such as natural or synthetic rubber. The elastomers for use herein include, illustratively, in addition, to synthetic and natural polyisoprene, poly (chloroprene), GRS, Buna-S styrenebutadiene copolymers, poly (isobutylene-isoprene) and the like. The elastomer, whether one of the foregoing or another, such as are well known to those skilled in the art, is one characterized, in a significantly preferred embodiment, by a durometer hardness as determined by a durometer gage according to ASTM D 2240-68, read using a Type A scale, of within the range of 65 to 75 and preferably about 70; a minimum tensile strength as determined by ASTM D 412 of 600 psi. min. up to 1500 psi and, indeed, up to 2000 psi. min., but normally about 1000 psi. min; with a compression set resistance according to ASTM D 395 Method B of about 40 percent to about 10 percent; and preferably in the latter portion of this range, i.e. 20 percent to 15 percent.

The dome 52 of the valve 14 is most desirably of an arcuate configuration to facilitate a smooth path for the flow of water. It is desirable that the dome 52 extend appreciably beyond the diameter of the hole of the washer 56 for the purpose of providing an effective retaining member or shoulder 53, but that the dome 52 avoid being so obtrusive that it hinders the free passage of fluid through the valve chamber 32 when the valve 14 is removed from the valve seat 60 and is in the open state.

Figure 5:
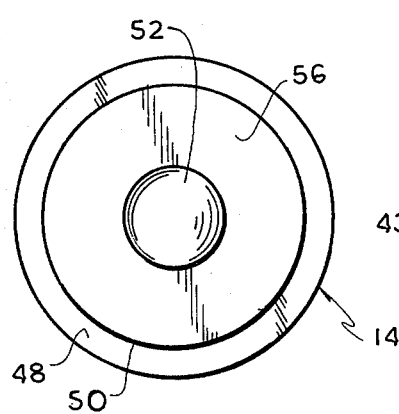
FIG. 5 is a plan view of the under side of the swivel valve of the invention shown in FIG. 3.

The annular and concentric disposition of the dependent flange 48, washer 56 and dome 52 of the valve 14 are further illustrated in FIG. 5 of the drawings.

A valve assembly, as thus described, permits for adjustment of the valve to any misalignment that may occur in the relation of the annular valve washer 56 to the underlying stationary valve seat 60 and also permits for free rotation of the valve stem 12 when the valve 14 is impressed on the valve seat 60 with consequent elimination of friction therebetween without a compensating increase of the frictional coefficient occurring between the valve 14 and the valve stem 12; indeed with a minimization of such friction that is surprising in view of the secure engagement with accommodation for swivel adjustment achieved by the engagement of the valve 14 to the valve stem 12 in accordance with the invention.

The arms 44 and fingers 46 are, as aforesaid, critical to effect this swivel adjustment. It is significant that the fingers 46 are so removed from the bearing surface in a preferred embodiment as to avoid abutting the flange 31 defining the upper limit of the stem groove 38, particularly when the compression washer 56 is impinging upon the valve seat 60; thus precluding any possible frictional engagement between the upper surfaces of the fingers 46 and the corresponding under surface of the flange 31.

The elastomeric compressible composition of the washer 56 and the rigid, but selectively resilient, character of the remainder of the valve 14 are, as has been made evident elsewhere, also significant in achieving the advantages of the present invention.

It will be evident that the elastomeric and rigid but resilient compositions of the valve assembly must not degrade at the temperatures of the fluids passing through the valve system employed in accordance with the invention or be chemically reactive with or absorptive of these fluids.

It will be evident, too, that the terms and expressions that have been employed herein are used as terms of description and not of limitation. There is no intention in the use of these terms and expressions of excluding equivalents of the features shown and described and portions thereof, and it is recognized that various modifications are possible within the scope of the invention claimed.

We claim:

1. A faucet valve assembly comprising a valve stem and a swivel valve; one end of said valve stem defining a radially expanded foot member and an annular groove disposed about said stem adjacent said expanded foot member, the opposing end of said stem being adapted to receive a faucet handle; said swivel valve comprising an annular valve body having a bearing surface adapted to mate with the bottom radially expanded surface of said foot member, gripping means adapted to engage one end of said valve stem, said gripping means comprising a plurality of resilient vertically disposed arms spaced about the periphery of one surface of said valve body, said arms terminating in a plurality of inwardly and radially directed fingers adapted to engage said annular groove formed in said valve stem to provide free rotation of said valve stem independently of the rotation of said valve; a dependent annular skirt disposed peripherally about the opposite surface of said valve body; an axially disposed neck element descending from said latter surface and terminating in an expanded knob; said skirt, neck and knob forming an annular recess; and a compression washer of resilient, compressible composition disposed in said annular recess; said washer having a valve seat engaging surface.

2. A valve assembly as claimed in claim 1 wherein said bearing surface is modified to define a radially disposed recess.

3. A valve assembly as claimed in claim 1 wherein said valve body, exclusive of said washer, comprises a hard, non-compressible thermoplastic resin, and said washer comprises a cured or vulcanized elastomeric thermosetting resin.

4. A valve assembly as claimed in claim 1 wherein the annular border of said washer extends below the level of said annular skirt.

5. A valve assembly as claimed in claim 1 wherein said expanded knob terminates at a level below that of said annular skirt and said compression washer; and includes an annular shoulder adapted to retain said washer in place.

6. A valve assembly as claimed in claim 3 wherein said valve body exclusive of said compression washer comprises a polyacetal resin.

7. A valve assembly as claimed in claim 1 or 3 wherein the arms of said valve are resilient.

8. A valve assembly as claimed in claim 1 or 7 wherein said arms are adapted to abut the lateral surface of said expanded terminal end of said valve stem disposed below the level of said annular groove.

9. A valve assembly as claimed in claim 8 wherein said arms, each terminating in an inwardly directed finger, are from 3 to 6 in number and embrace up to about one third of the lateral surface of said expanded terminal end of said stem.

10. A valve assembly as claimed in claim 9 wherein said arms and corresponding fingers are four in number.

11. A valve as claimed in claim 1, wherein said valve body comprises a polyacetal resin having a dynamic coefficient of friction in contact with steel, brass or aluminum of within the range of about 0.10 to about 0.35.

12. A valve as claimed in claim 11 wherein said coefficient of friction is about 0.15.

13. A valve housing including a valve passage way defining a valve seat, a valve stem adapted to pass axially toward and away from said valve seat, said stem including an axially expanded foot and an annular flange disposed along the axis of said stem in spaced relation to said foot, said flange forming in cooperation with said foot an annular groove therebetween, a valve body carried by said foot and including a compressible washer at one end adapted to engage said valve seat upon closure of said valve and a bearing surface at the opposite end of said valve body adapted to frictionally engage at least a portion of the corresponding flat surface of said foot of said valve stem; said valve body including gripping means about the periphery of said bearing surface; said gripping means comprising a plurality of resilient approximately vertically disposed arms spaced about the periphery of said valve body and terminating in a plurality of inwardly and radially directed fingers adapted to engage said annular groove disposed about said valve stem and adapted to provide free rotation of said valve stem when rotation of said valve is impeded; said valve body being composed of a non-compressible, non-metallic material having a low coefficient of friction with respect to any material of which said valve stem is formed, whereby the frictional resistance to rotation of said valve stem, when rotation of said valve body is impeded, is minimal.

14. A valve housing as claimed in claim 13 wherein said flange forming the upper margin of said annular groove is spaced from the bearing surface of said valve body a distance greater than the distance from said surface defined by said arms and fingers.

15. A valve housing as claimed in claim 13 wherein said bearing surface of said valve body includes a radially defined recess.

16. A valve housing as claimed in claim 15 wherein said recess is adapted to entrap liquid passing through said valve and utilize said liquid as a low friction bearing between said bearing surface and the radially expanded under surface of said flattened foot of said valve stem.

17. A faucet valve assembly comprising a valve stem and a swivel valve; one end of said valve stem defining a radially expanded foot member and an annular groove disposed about said stem adjacent said expanded foot member, the opposing end of said stem being adapted to receive a faucet handle; said swivel valve comprising an annular valve body having a bearing surface adapted to mate with the bottom radially expanded surface of said foot member, gripping means adapted to engage one end of said valve stem, said gripping means comprising a plurality of resilient vertically disposed arms spaced about the periphery of one surface of said valve body, said arms terminating in a plurality of inwardly and radially directed fingers adapted to engage said annular groove formed in said valve stem to provide free rotation of said valve stem independently of the rotation of said valve; a dependent annular skirt disposed peripherally about the opposite surface of said valve body; an axially disposed neck element descending from said latter surface and terminating in an expanded knob; said skirt, neck and knob forming an annular recess; and a compression washer of resilient, compressible composition disposed in said annular recess; said washer having a valve seat engaging surface; and wherein said bearing surface is provided as a radially disposed shoulder formed within the periphery of said valve body intermediate between the axis of said valve body and the base of each of said vertically disposed arms.

18. A valve assembly as claimed in claim 17 wherein the interior surface of said valve body within said shoulder defines a recess adapted to entrap liquid passing through said valve body and utilize said liquid as a low friction bearing.

19. A valve assembly as claimed in claim 17 wherein said shoulder is uninterrupted and, when incorporated in a valve housing, is in axial alignment with the periphery of the valve system and said valve seat engaging surface of said assembly.

20. A faucet valve assembly as claimed in claim 17 wherein said bearing surface of said valve body includes a radially defined recess, and disposed about said recess and forming the outer border thereof, an axially disposed shoulder adapted, in combination with said arms and fingers, to secure said swivel valve and said valve stem in vertically fixed engagement.

21. A faucet valve assembly as claimed in claim 20 wherein said shoulder and said valve stem are disposed in axial alignment with each other and with an annular compression washer mounted in the surface of said valve body opposite that defining said bearing surface.

22. A valve housing including a valve passage way defining a valve seat, a valve stem adapted to pass axially toward and away from said valve seat, said stem including an axially expanded foot and an annular flange disposed along the axis of said stem in spaced relation to said foot, said flange forming in cooperation with said foot an annular groove therebetween, a valve body carried by said foot and including a compressible washer at one end and adapted to engage said valve seat upon closure of said valve and a bearing surface at the opposite end of said valve body adapted to frictionally engage at least a portion of the corresponding surface of said foot of said valve stem; said valve body including gripping means about the periphery of said bearing surface; said gripping means comprising a plurality of resilient approximately vertically disposed arms spaced about the periphery of said valve body and terminating in a plurality of inwardly and radially directed fingers adapted to engage said annular groove disposed about said valve stem and adapted to provide free rotation of said valve stem when rotation of said valve is impeded; said valve body being composed of a non-compressible, non-metallic material having a low coefficient of friction with respect to any material of which said valve stem is formed, whereby the frictional resistance to rotation of said valve stem when rotation of said valve body is impeded, is minimal; and wherein said bearing surface comprises a radially defined recess; a shoulder disposed about said recess, and within the gripping means mounted about the periphery of said valve body, and in axial alignment with the periphery of said valve stem.

* * * * *